US012169458B2

(12) United States Patent
Palmer (10) Patent No.: US 12,169,458 B2
(45) Date of Patent: *Dec. 17, 2024

(54) PAGE IDENTIFICATION WITHIN A LOGICAL TO PHYSICAL TABLE

(71) Applicant: Lodestar Licensing Group LLC, Evanston, IL (US)

(72) Inventor: David A. Palmer, Boise, ID (US)

(*) Notice: Subject to any disclaimer, the term of this patent is extended or adjusted under 35 U.S.C. 154(b) by 69 days.

This patent is subject to a terminal disclaimer.

(21) Appl. No.: 18/081,474

(22) Filed: Dec. 14, 2022

(65) Prior Publication Data

US 2023/0185728 A1     Jun. 15, 2023

Related U.S. Application Data

(63) Continuation of application No. 17/017,286, filed on Sep. 10, 2020, now Pat. No. 11,537,526.

(51) Int. Cl.
*G06F 12/1009* (2016.01)

(52) U.S. Cl.
CPC .. *G06F 12/1009* (2013.01); *G06F 2212/7201* (2013.01)

(58) Field of Classification Search
CPC ............ G06F 12/1009; G06F 2212/7201
See application file for complete search history.

(56) References Cited

U.S. PATENT DOCUMENTS

| 9,785,572 | B1 | 10/2017 | Lercari et al. |
| 2007/0204128 | A1* | 8/2007 | Lee ............... G06F 12/0246 365/185.11 |
| 2009/0307413 | A1 | 12/2009 | Chu |
| 2013/0262748 | A1 | 10/2013 | Chang |
| 2014/0047210 | A1 | 2/2014 | Cohen et al. |
| 2014/0156968 | A1 | 6/2014 | Terry et al. |
| 2014/0281315 | A1 | 9/2014 | Danilak et al. |
| 2016/0162509 | A1 | 6/2016 | Berrington et al. |
| 2017/0139826 | A1 | 5/2017 | Sugimori |
| 2017/0147499 | A1 | 5/2017 | Mohan et al. |
| 2018/0189000 | A1 | 7/2018 | Li et al. |
| 2018/0276135 | A1 | 9/2018 | Oikawa |
| 2018/0329632 | A1 | 11/2018 | Li et al. |
| 2019/0310780 | A1 | 10/2019 | Gholamipour et al. |
| 2019/0324644 | A1 | 10/2019 | Jin et al. |

(Continued)

OTHER PUBLICATIONS

"International Search Report and Written Opinion of the International Searching Authority," issued in connection with Int'l Appl. No. PCT/US21/47529, dated Nov. 18, 2021 (12 pages).

(Continued)

*Primary Examiner* — Chie Yew (57) ABSTRACT

Methods, systems, and devices for data alignment for logical to physical table compression are described. A controller coupled with the memory array may receive a command to access a logical block address associated with a memory device. In some cases, a first portion of a physical address of the memory device associated with the logical block address may be identified. The controller may perform an operation on the logical block address included in the command and identify a second portion of the physical address based on performing the operation. The physical address of the memory device may be accessed based on identifying the first portion and the second portion.

18 Claims, 6 Drawing Sheets

(56) References Cited

U.S. PATENT DOCUMENTS

2020/0073804 A1\* 3/2020 Moon .................. G11C 11/409
2021/0173785 A1 6/2021 Jin et al.

OTHER PUBLICATIONS

ISA/KR, International Search Report and Written Opinion of the International Searching Authority, Int'l Appl. No. PCT/US2021/047529, Nov. 18, 2021, Korean Intellectual Property Office, Seo-gu, Daejeon, Republic of Korea, 15pgs.

\* cited by examiner

| Cursor 400 | | | | | |
|---|---|---|---|---|---|
| | | Die 405-a | | Die 405-b | |
| | | Plane 410-a | Plane 410-b | Plane 410-a | Plane 410-b |
| Block 415 | Page 420-a | LBA 425-a | LBA 425-b | LBA 425-c | LBA 425-d |
| | Page 420-b | LBA 425-e | ••• | ••• | ••• |
| | Page 420-c | ••• | ••• | ••• | ••• |
| | Page 420-d | ••• | LBA *M* | Data 430 | Data 430 |

PAGE IDENTIFICATION WITHIN A LOGICAL TO PHYSICAL TABLE

CROSS REFERENCE

The present Application for Patent is a continuation of U.S. patent application Ser. No. 17/017,286 by Palmer, entitled "DATA ALIGNMENT FOR LOGICAL TO PHYSICAL TABLE COMPRESSION," filed Sep. 10, 2020, assigned to the assignee hereof, and is expressly incorporated by reference in its entirety herein.

BACKGROUND

The following relates generally to one or more systems for memory and more specifically to data alignment for logical to physical table compression.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D Xpoint), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Some memory systems use logical-to-physical (L2P) tables to map logical block addresses (LBAs) with physical addresses. The LBAs may be used by the host system to identify stored data, and the physical address may be used by the memory system to identify stored data. In some cases, the L2P table may be updated and stored within the memory system for use. As the size and complexity of the memory systems increase, the size and complexity of the L2P tables may also increase. Increasing the size and complexity of the L2P table may decrease the overall performance of the memory system, thereby increasing the latency for other operations related to the host system and decreased read, write, and erase speeds and efficiency. For example, as the size of the L2P table increases, the size of the memory used for user data may be decreased. In such cases, techniques to reduce a size of each entry in the L2P table, thereby reducing the total size of the L2P table and reduce the size of the memory used to store the L2P table may be desired.

Systems, devices, and techniques are described for compressing data stored by the L2P table of a memory system. Data stored by the L2P table may be compressed by using a LBA provided by a host system as an index for the L2P table (e.g., using the LBA as an input to an operation, such as a modulo operation, to determine the index). In such cases, the LBA provided by the host system and the L2P table may be used to generate a first portion of a physical address, and the LBA and the operation may be used to generate a second portion of a physical address. Using both the first portion and the second portion, a memory system may identify a location (or physical address) in the memory device to access.

Such techniques (e.g., compressing data stored by the L2P table) may increase the overall performance of the memory system, thereby decreasing the latency for other operations related to the host system. For example, aligning data for L2P table compression may reduce the size of the L2P table and improve the overall efficiency of the memory system, which may result in the memory system experiencing improved read, write, and erase speeds, reduced power consumption, improved processing times and the like.

Features of the disclosure are initially described in the context of a system as described with reference to FIG. 1. Features of the disclosure are described in the context a system, a diagram, and cursor as described with reference to FIGS. 2-4. These and other features of the disclosure are further illustrated by and described with reference to an apparatus diagram and a flowchart that relate to data alignment for logical to physical table compression as described with reference to FIGS. 5 and 6.

Figure 1:
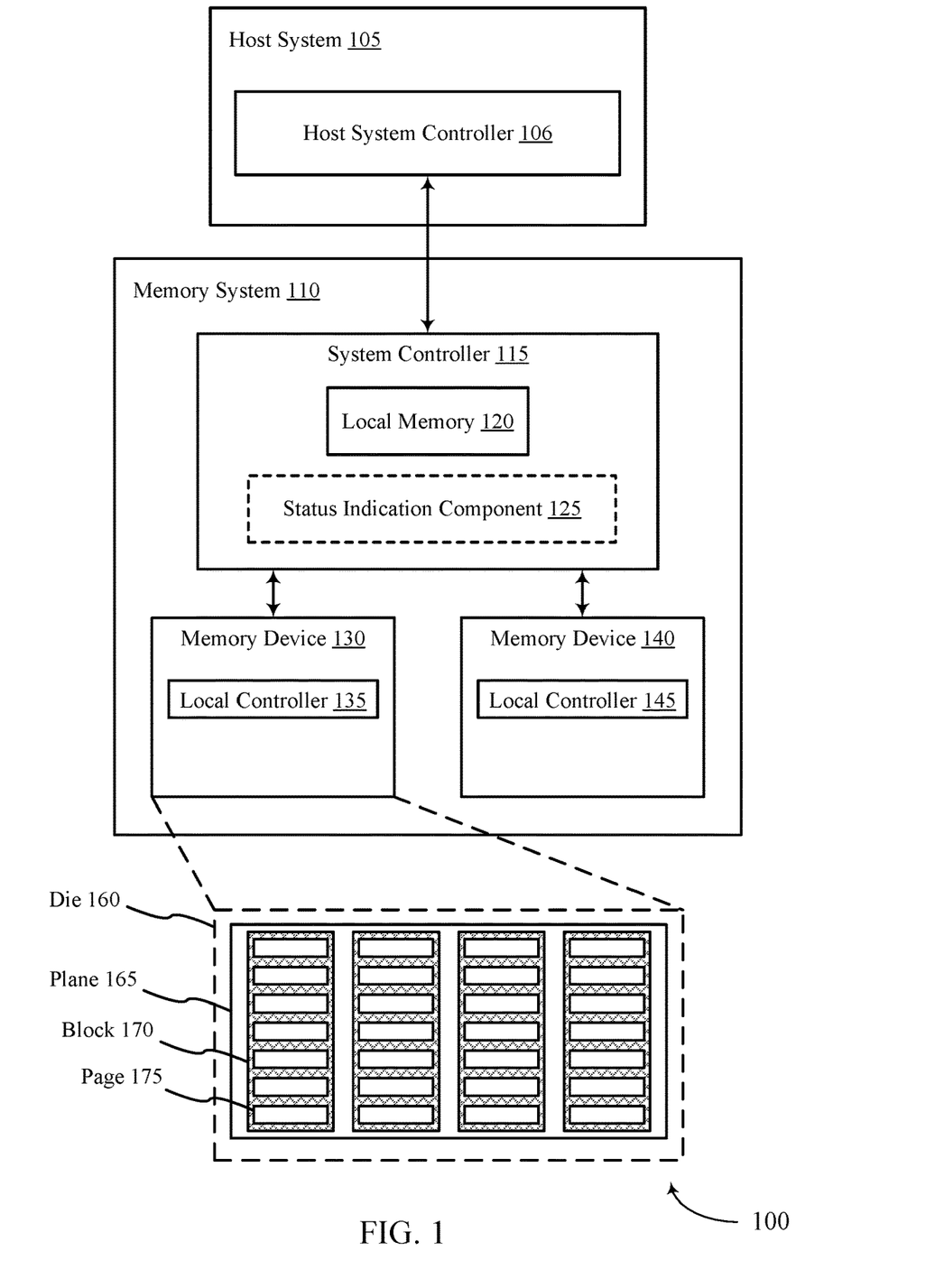
FIG. 1 illustrates an example of a system that supports data alignment for logical to physical table compression in accordance with examples as disclosed herein.

FIG. 1 illustrates an example of a system 100 that supports data alignment for logical to physical table compression in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB)

flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, SATA controller). The host system 105 may use the memory system 110, for example, to write data to the memory system 110 and read data from the memory system 110. Although one memory system 110 is shown in FIG. 1, it is to be understood that the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a serial advanced technology attachment (SATA) interface, a UFS interface, an eMMC interface, a peripheral component interconnect express (PCIe) interface, USB interface, Fiber Channel, Small Computer System Interface (SCSI), Serial Attached SCSI (SAS), Double Data Rate (DDR), a dual in-line memory module (DIMM) interface (e.g., DIMM socket interface that supports DDR), Open NAND Flash Interface (ONFI), Low Power Double Data Rate (LPDDR). In some examples, one or more such interfaces may be included in or otherwise supported between a host system controller 106 of the host system 105 and a system controller 115 of the memory system 110. In some examples, the host system 105 may be coupled with the memory system 110 (e.g., the host system controller 106 may be coupled with the system controller 115) via a respective physical host interface for each memory device 130 or memory device 140 included in the memory system 110, or via a respective physical host interface for each type of memory device 130 or memory device 140 included in the memory system 110.

Memory system 110 may include a system controller 115, a memory device 130, and a memory device 140. A memory device 130 may include one or more memory arrays of a first type of memory cells (e.g., a type of non-volatile memory cells), and a memory device 140 may include one or more memory arrays of a second type of memory cells (e.g., a type of volatile memory cells). Although one memory device 130 and one memory device 140 are shown in the example of FIG. 1, it is to be understood that memory system 110 may include any quantity of memory devices 130 and memory devices 140, and that, in some cases, memory system 110 may lack either a memory device 130 or a memory device 140.

The system controller 115 may be coupled with and communicate with the host system 105 (e.g., via the physical host interface). The system controller 115 may also be coupled with and communicate with memory devices 130 or memory devices 140 to perform operations such as reading data, writing data, erasing data, or refreshing data at a memory device 130 or a memory device 140, and other such operations, which may generically be referred to as access operations. In some cases, the system controller 115 may receive commands from the host system 105 and communicate with one or more memory devices 130 or memory devices 140 to execute such commands (e.g., at memory arrays within the one or more memory devices 130 or memory devices 140). For example, the system controller 115 may receive commands or operations from the host system 105 and may convert the commands or operations into instructions or appropriate commands to achieve the desired access of the memory devices 130 or memory devices 140. And in some cases, the system controller 115 may exchange data with the host system 105 and with one or more memory devices 130 or memory devices 140 (e.g., in response to or otherwise in association with commands from the host system 105). For example, the system controller 115 may convert responses (e.g., data packets or other signals) associated with the memory devices 130 or memory devices 140 into corresponding signals for the host system 105.

The system controller 115 may be configured for other operations associated with the memory devices 130 or memory devices 140. For example, the system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 105 and physical addresses (e.g., physical block addresses) associated with memory cells within the memory devices 130 or memory devices 140.

The system controller 115 may include hardware such as one or more integrated circuits or discrete components, a buffer memory, or a combination thereof. The hardware may include circuitry with dedicated (e.g., hard-coded) logic to perform the operations ascribed herein to the system controller 115. The system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The system controller 115 may also include a local memory 120. In some cases, the local memory 120 may include read-only memory (ROM) or other memory that may store operating code (e.g., executable instructions) executable by the system controller 115 to perform functions ascribed herein to the system controller 115. In some cases, the local memory 120 may additionally or alternatively include static random access memory (SRAM) or other memory that may be used by the system controller 115 for internal storage or calculations, for example, related to the functions ascribed herein to the system controller 115. Additionally or alternatively, the local memory 120 may serve as a cache for the system controller 115. For example, data may be stored to the local memory 120 when read from or written to a memory device 130 or memory device 140, and may be available within the local memory 120 for subsequent retrieval for or manipulation (e.g., updating) by the host system 105 (e.g., with reduced latency relative to a memory device 130 or memory device 140) in accordance with a cache policy.

Although the example of memory system 110 in FIG. 1 has been illustrated as including the system controller 115, in some cases, a memory system 110 may not include a system controller 115. For example, the memory system 110 may additionally or alternatively rely upon an external controller (e.g., implemented by the host system 105) or one or more local controllers 135 or local controllers 145, which may be internal to memory devices 130 or memory devices 140, respectively, to perform the functions ascribed herein to the system controller 115. In general, one or more functions ascribed herein to the system controller 115 may in some cases instead be performed by the host system 105, a local controller 135, or a local controller 145, or any combination thereof.

A memory device 140 may include one or more arrays of volatile memory cells. For example, a memory device 140 may include random access memory (RAM) memory cells, such as dynamic RAM (DRAM) memory cells and synchronous DRAM (SDRAM) memory cells. In some examples, a memory device 140 may support random access operations (e.g., by the host system 105) with reduced latency relative to a memory device 130, or may offer one or more other performance differences relative to a memory device 130.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM).

In some examples, a memory device 130 or a memory device 140 may include (e.g., on a same die or within a same package) a local controller 135 or a local controller 145, respectively, which may execute operations on one or more memory cells of the memory device 130 or the memory device 140. A local controller 135 or a local controller 145 may operate in conjunction with a system controller 115 or may perform one or more functions ascribed herein to the system controller 115. In some cases, a memory device 130 or a memory device 140 that includes a local controller 135 or a local controller 145 may be referred to as a managed memory device and may include a memory array and related circuitry combined with a local (e.g., on-die or in-package) controller (e.g., local controller 135 or local controller 145). An example of a managed memory device is a managed NAND (MNAND) device.

In some cases, a memory device 130 may be or include a NAND device (e.g., NAND flash device). The memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the system controller 115 may mark or otherwise designate the data that remains in the old block 170 as invalid or obsolete, and update an L2P mapping table to associate the logical address (e.g., LBA) for the data with the new, valid block 170 rather than the old, invalid block 170. In some cases, such copying and remapping may be preferable to erasing and rewriting the entire old block 170, due to latency or wearout considerations, for example. In some cases, one or more copies of an L2P mapping table may be stored within the memory cells of the memory device 130 (e.g., within or more blocks 170 or planes 165) for use (e.g., reference and updating) by the local controller 135 or system controller 115.

In some cases, L2P tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a system controller 115, a local controller 135, or a local controller 145 may perform operations (e.g., as part of one or more media management algorithms) for a memory device 130 or a memory device 140, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support data alignment for logical to physical table compression. For example, the host system 105, the system controller 115, a memory device 130, or a memory device 140 may include or otherwise may access one or more non-transitory computer readable media storing instructions (e.g., firmware) for performing the functions ascribed herein to the host system 105, system controller 115, memory device 130, or memory device 140. For example, such instructions, when executed by the host system 105 (e.g., by the host system controller 106), by the system controller 115, by a memory device 130 (e.g., by a local controller 135), or by a memory device 140 (e.g., by a local controller 145), may cause the host system 105, system controller 115, memory device 130, or memory device 140 to perform associated functions as described herein.

In some cases, the memory system 110 may compress data stored by the L2P table of the memory system 110. For example, the memory system 110 may receive a command to access a LBA associated with memory device 140. In some examples, the LBA may be used by the host system 105 to identify stored data. The memory system 110 may identify a first portion and a second portion of a physical address of the memory device 140 associated with the LBA. In some cases, the physical address may be used by the memory system 110 to identify stored data. The memory system 110 may identify the first portion based on the LBA and a L2P table look-up procedure. The memory system 110 may identify the second portion by performing a modulo operation on the LBA included in the command. The memory system 110 may then access the physical address of the memory device 140 based on identifying the first portion and the second portion.

In some examples, the memory system 110 may identify a section (e.g., big logical page) of the memory device 140 associated with the LBA. The memory system may identify the section based on the LBA and the L2P table stored by the memory device 140. The L2P table may store a mapping between LBAs and sections of the memory device 140. In some examples, the first page of the section may be identified based on performing the modulo operation. In such cases, the memory system 110 may access the first page based on accessing the physical address.

Such techniques may decrease the size and complexity of the L2P table, thereby increasing the overall performance of the memory system 110. For example, such techniques may increase the efficiency of the L2P table cache memory as an increased quantity of L2P table entries may be stored in a same portion of shared memory. In some cases, compressing data stored by the L2P table may increase an quantity of available (e.g., free) blocks 170 that may be used to increase over provisioning, thereby reducing the write amplification factor, improving total bytes written, and improving the write performance of the memory system 110. Each block 170 that may be dedicated to L2P table management may be able to include an increased quantity of entries based on compressing data stored by the L2P table.

Figure 2:
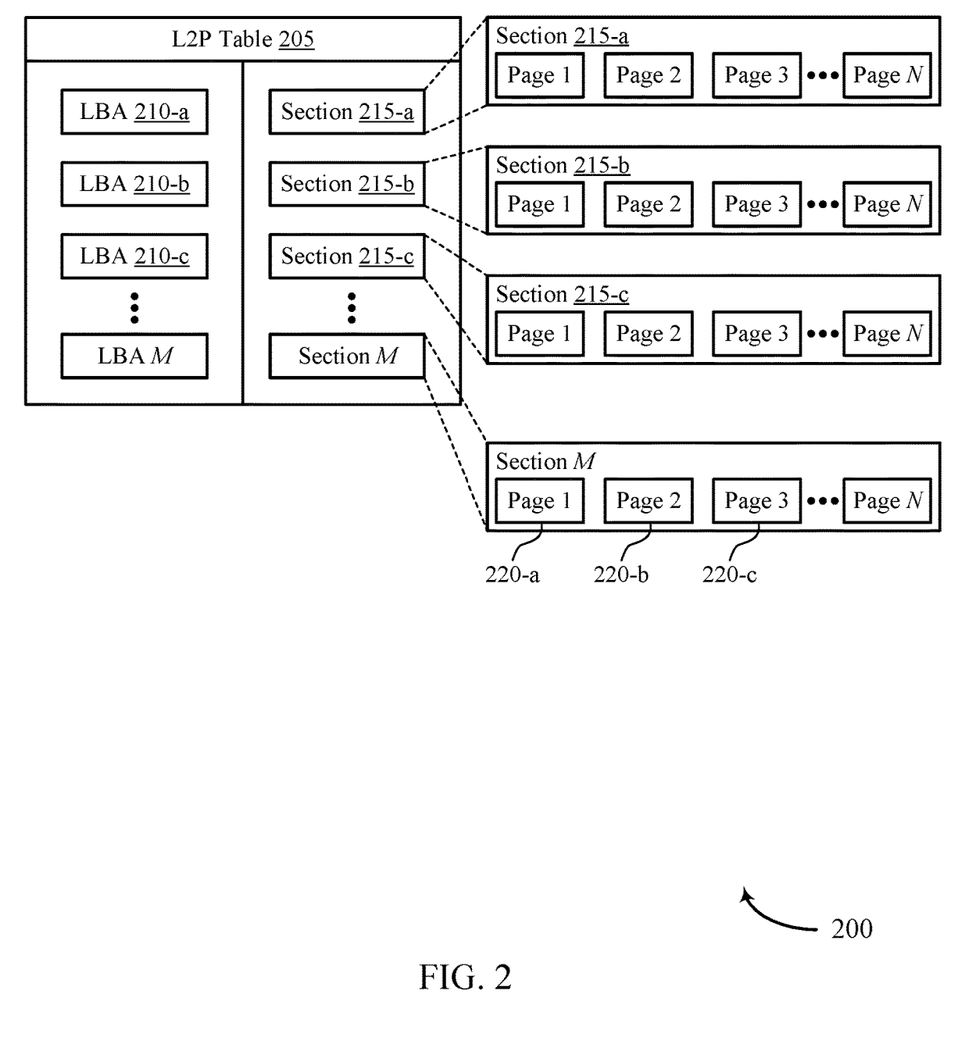
FIG. 2 illustrates an example of a system that supports data alignment for logical to physical table compression in accordance with examples as disclosed herein.

FIG. 2 illustrates an example of a system 200 that supports data alignment for logical to physical table compression in accordance with examples as disclosed herein. The system 200 may include a L2P table 205 where the L2P table 205 may include a plurality of LBAs 210 (e.g., LBA 210-*a*, 210-*b*, and 210-*c*) and a plurality of sections 215 (e.g., 215-*a*, 215-*b*, and 215-*c*).

The L2P table 205 may store a mapping between LBAs 210 and sections 215 of the memory device. In some examples, the LBA 210 may be associated with a corresponding section 215. In such cases, LBA 210-*a* may be associated with section 215-*a*, LBA 210-*b* may be associated with section 215-*b*, and LBA 210-*c* may be associated with section 215-*c*. In some cases, a variety of mappings between the LBA 210 and the section 215 may occur. For example, LBA 210-*a* may be associated with section 215-*b* or section 215-*c*. The sections 215 may each be an example of a big logical page. In such cases, an identifier of the sections 215 may be included in the L2P table 205. Each section 215 may include a plurality of pages 220. For example, section 215 may include pages 220-*a*, 220-*b*, and 220-*c*.

In other systems, the L2P table 205 may map each LBA 210 associated with the host system with a physical address. Each physical address may be 32 bits wide, thereby increasing the size of the L2P table 205 as a quantity of entries or bits in each entry in the L2P table 205 increases. In such cases, the memory system may use an increased amount of resources to manage the L2P table 205. In some examples, addressing physical addresses may use an increased quantity of bits to identify the physical addresses for host block data. The physical address may include an identification of the plane, block, and page which may use an additional bits, thereby increasing inefficiencies of the memory system.

For example, the physical address may be a function of the die address, plane address, block address, page address, and subpage address. In some cases, the memory system may select a die as part of the physical address, thereby selecting a corresponding plane, block, page, and subpage. One or more bits may be associated with each die, plane, page, and subpage for addressing the memory system. For example, the memory system may select four dies which may include two bits to address, and the memory system may select two planes which may include one bit to address. The memory system may select 600 blocks that may include ten bits to address, and the memory system may select 768 pages which may include ten bits to address. The memory system may select four subpages which may include two bits to address. In such cases, the memory system may address a total of 25 bits, as an example, however, any quantity of bits for an address is possible.

Storing physical addresses in the L2P table 205 may increase the size and complexity of the L2P table 205. In some examples, the memory system may experience inefficiencies in storing the L2P table 205, thereby increasing the size and cost of the memory device. Increasing the size and complexity of the L2P table 205 may decrease the overall performance of the memory system, thereby increasing the latency for other operations related to the host system and decreased read, write, and erase speeds and efficiency. In some cases, the size and complexity of the L2P table 205 may also increase when a quantity of entries that store a mapping between LBAs 210 and sections 215 increases.

In such cases, the memory system may reduce a size of each entry (e.g., physical address) in the L2P table 205 which may reduce the total size of the L2P table 205 and reduce the size of the memory used to store the L2P table 205. In some examples, the memory system may compress data stored by the L2P table 205. For example, the memory system may compress (e.g., reduce) a quantity of bits stored in each entry in the L2P table 205 by applying an operation to the LBA 210, thereby reducing a quantity of bits used by the address based on applying the data compression. In such cases, data stored by the L2P table 205 may be compressed using the LBA (e.g., LBA 210-a) provided by a host system as an index for the L2P table 205 and using the same LBA (e.g., LBA 210-a) as an input to an operation.

In some examples, the memory system may partition the shared memory into sections 215 (e.g., big logical pages) where incoming host data may be mapped into fixed locations within the section 215 based on a modulo operation on the LBA 210. For example, the memory system may include 16 blocks, and the incoming host LBA M may be written to position M modulo 8 within the associated section 215. Each section 215 may include pages 220 where each page 220 may include 4 KB of host data.

When writing host data or performing a garbage collection procedure, the memory system may layout host data (e.g., insert into a page 220) within the section 215 such that the position of each host LBA 210 within the section 215 may be based on the address modulo and the size of the section 215. For example, if the section 215 may be 32 KB, the section 215 may include eight 4 KB host LBAs 210. In such cases, an incoming LBA M may be written into the section 215 at the position within the section 215 of M modulo 8.

Decreasing the size and complexity of the L2P table 205 may decrease a quantity of bits used by the address, thereby improving the operations and efficiency of the memory device. In some cases, the reduced quantity of bits may be removed from the entry in the table and may thereby reduce the size of an entry. In some cases, the reduced quantity of bits may cause certain bit locations to be used for different purposes. The unused bits due to the compression may be an example of free bits. In such cases, the free bits may be used to flag corrupt data, unmapped data, hot or cold data, or a combination thereof. For example, the memory system may identify corrupt data, unmapped data, garbage collection data, or a combination thereof based on one or more bits included in the L2P table 205 for the LBA 210. In some examples, the frequency of table garbage collection may be reduced based on decreasing the size of the L2P table 205. In some cases, the memory system may scan the L2P table 205 and set a bit in each record that may be unmapped. In such cases, if the host system transmits a read request, the memory system may determine which data may be unmapped based on the bit set in each record.

Figure 3:
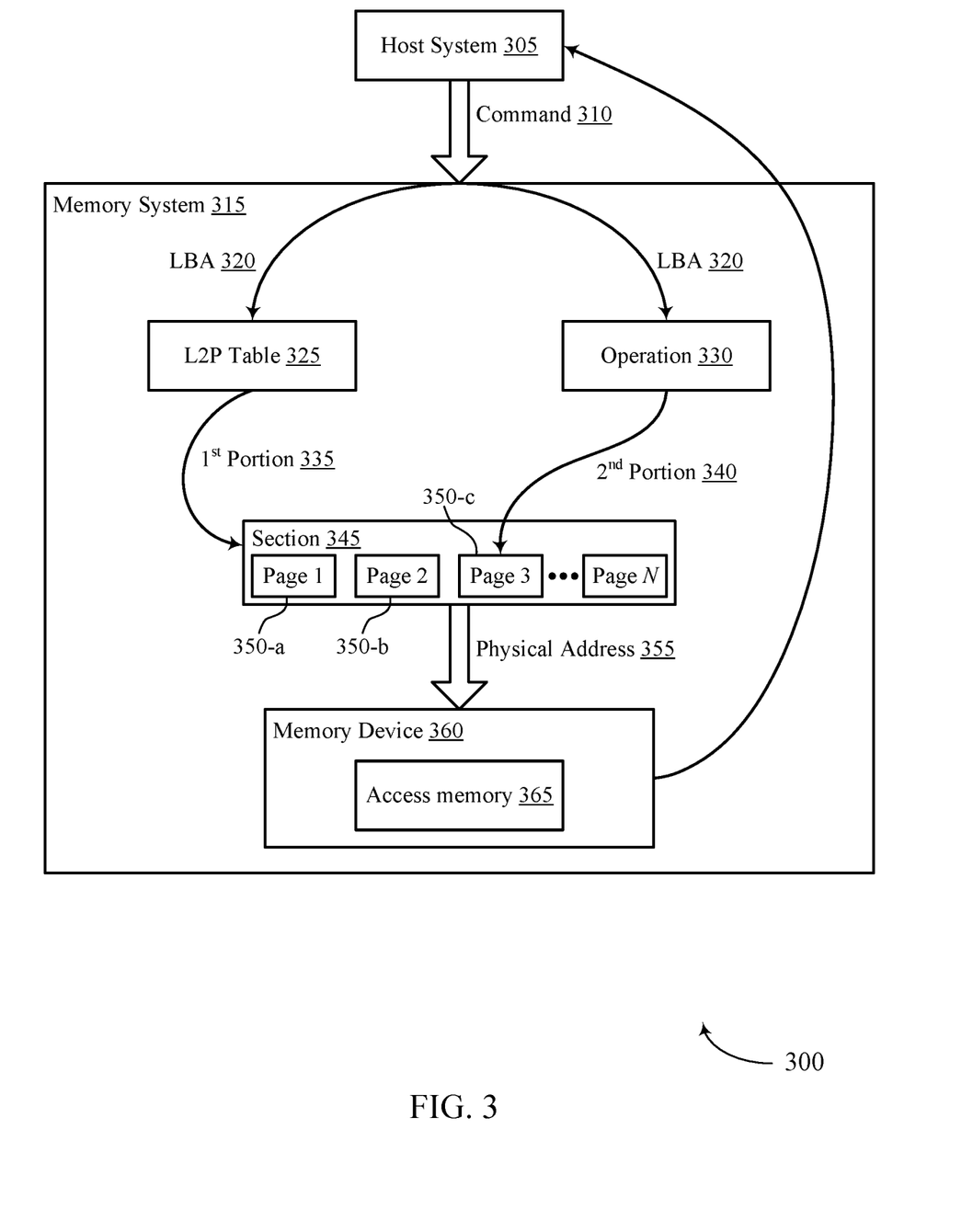
FIG. 3 illustrates an example of a diagram that supports data alignment for logical to physical table compression in accordance with examples as disclosed herein.

FIG. 3 illustrates an example of a diagram 300 that supports data alignment for logical to physical table compression in accordance with examples as disclosed herein. The diagram 300 may include a host system 305, a memory system 315, and a memory device 360 which may be examples of the host system, the memory system, and the memory device, respectively, as described with reference to FIGS. 1 and 2. The diagram 300 may also include a LBA 320, a L2P table 325, a section 345, and pages 350 which may be examples of the LBAs, the L2P table, the sections, and the pages, respectively, as described with reference to FIG. 2.

Aspects of the diagram 300 may be implemented by a controller, among other components. Additionally or alternatively, aspects of the diagram 300 may be implemented as instructions stored in memory (e.g., firmware stored in a memory coupled with the memory system). For example, the instructions, when executed by a controller (e.g., the system controller 115), may cause the controller to perform the operations of the diagram 300.

Storing physical addresses 355 in the L2P table 325 may increase the size and complexity of the L2P table 325. In some examples, the memory system 315 may experience inefficiencies in storing the L2P table 325 within the memory system 315, thereby increasing the size and cost of the memory device 360. In such cases, the memory system 315 may reduce a size of each entry in the L2P table 325 (e.g., compress data in the L2P table 325) and partition the shared memory into sections 345 (e.g., big logical pages) where incoming data from host system 305 may be mapped into fixed locations within the section 345. By the memory system 315 compressing data stored by the L2P table 325, the memory system 315 may recreate the information using other means (e.g., the operation illustrated in the diagram 300).

The host system 305 may transmit a command 310 to the memory system 315. In some cases, the memory system 315 may receive the command 310 to access a plurality of LBAs 320 associated with the memory device 360. In such cases, the memory system 315 may perform data alignment for L2P table 325 compression on more than one LBA 320. In other examples, the memory system 315 may receive a command 310 to access a single LBA (e.g., LBA 320) associated with the memory device 360.

The memory system 315 may use the LBA 320 associated with the command 310 and the compressed L2P table 325 to identify a first portion 335 of the physical address 355. The first portion 335 of the physical address 355 may be an example of the section 345. For example, the memory system 315 may identify a section 345 associated with the LBA 320 based on the LBA 320 and the L2P table 325 stored by the memory device 360. For example, the section 345 may include a plurality of pages 350 (e.g., page 350-a, 350-b, and 350-c) that may be each mapped to one of a plurality of physical addresses 355.

In such cases, the memory system 315 may identify a first portion 335 of the physical address 355 of the memory device 360 associated with the LBA 320 based on the LBA 320. In other examples, the memory system 315 may identify a first portion 335 of the physical address 355 of the memory device 360 associated with a plurality of LBAs 320 based on the plurality of LBAs 320. The memory system 315 may perform a look-up procedure to identify the first portion 335. For example, the memory system 315 may look-up a value of the received LBA in the L2P table 325. The value in the L2P table 325 may be an example of the first portion 335. In such cases, the first portion 335 may be directly obtained from the LBA 320 and the L2P table 325.

The memory system 315 may use the LBA 320 from command 310 as an input of an operation 330. In some examples, the performance cost of the memory system 315 operations may increase to store or transmit an additional bit. In such cases, the memory system 315 may move the additional bit to an algorithm (e.g., operation 330) that may be performed on the LBA 320. In such cases, the memory system 315 may use the LBA 320 to identify a second portion 340 of the physical address 355 based on the operation 330. The second portion 340 may be an example of a page index of section 345. For example, the memory system 315 may identify a page 350 of the plurality of pages 350 in the section 345 based on performing the operation 330 on the LBA 320. In some example, the operation 330 may be an example of a modulo operation. The memory system 315 may perform the operation 330 on a single LBA 320 included in the command 310. In some examples, the memory system 315 may perform the operation 330 on the plurality of LBAs 320 included in the command 310. In some cases, the operation 330 may be an example of a modulo operation, where the quantity of the modulo operation is equal to the quantity of pages associated with each section.

In some cases, the memory system 315 may identify a page index of the section 345 for storing data associated with the LBA 320 of the command 310 based on performing the operation 330 on the LBA 320. The page index may indicate a page 350 of the section 345. In such cases, the memory system 315 may access the physical address 355 by writing the data to the page 350 indicated by the page index. For example, the memory system 315 may identify page 350-*c* (e.g., page index) of the section 345 to write the LBA 320.

The L2P table 325 may include compressed data as discussed in reference to FIG. 2. In one example, diagram 300 may compress the quantity of bits stored in the L2P table 325 by reducing the quantity of bits from 25 bits to 20 bits (e.g., saving five bits). In such cases, the bits may be used from the planes identification. For example, if the memory system 315 selects 32 K planes that includes five bits to address, the section 345 may be 128 K. In such cases, the memory system 315 may include a 128 K section 345 to save five bits. The 768 entries in the L2P table that are associated with pages may become 192 associated with sections (e.g., sections 345) where each section 345 includes four pages, two planes, and 16 K subpages which may equal the 128 K section 345. The final address may include two bits addressed by the die, ten bits addressed by the block, eight bits addressed by the page, and no bits addressed by the subpages. In such cases, the diagram 300 may compress the quantity of bits stored in the L2P table 325 by reducing the quantity of bits from 25 bits to 20 bits (e.g., saving five bits). In another example, the diagram 300 may compress the quantity of bits stored in the L2P table 325 by reducing the quantity of bits from 25 bits to 24 bits (e.g., saving one bit). The single bit reduced from 25 bits to 24 bits may be used from the subpage indication. For example, if the memory system 315 includes 16 K subpages, the memory system 315 may include two 8 KB sections 345 which may include one bit to address.

The memory system 315 may modify the physical address mapping based on a quantity of bits to save from the physical address 355. For example, if the quantity of bits to save from the physical address 355 may be one bit, the single bit may be used from the LBA 320 instead of physical address 355. The memory system may package each LBA 320 in an 8 K portion (e.g., section 345). The modulo2 operation may be performed on the first LBA 320 and the moduluo2 operation may be performed on the second LBA 320. The first 4 K LBA 320 may be placed in the first 4 K of the physical address 355, and the second 3 K LBA 320 may be placed in any 4K of the physical address 355 preceding the first 4K of the physical address 355.

The memory system 315 may identify the physical address 355 based on identifying the first portion 335 and the second portion 340. In such cases, the memory system 315 may access memory 365 at the physical address 355 of the memory device 360 based at least in part on identifying the first portion 335, the second portion 340, and the physical address 355. For example, the memory system 315 may access memory 365 of the memory device 360 at the location indicated by the first portion 335 and the second portion 340. In some cases, the physical address 355 may be determined to access memory 365, but in other cases, the first portion 335 and the second portion 340 may be used to access memory 365 without determining the physical address 355. Access memory 365 may be an example of a read or write operation. Based on completing the access operation (e.g., access memory 365), the memory system 315 may send host requested data or other information to the host system 305.

Figure 4:
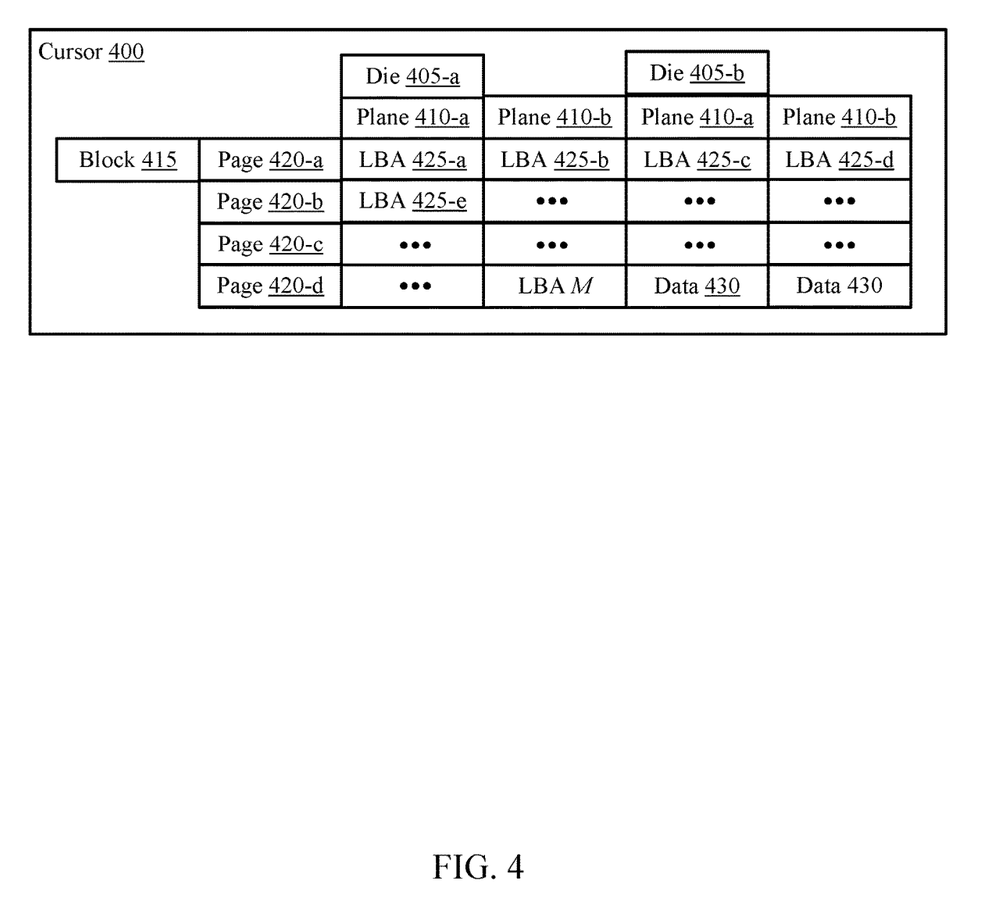
FIG. 4 illustrates an example of a cursor that supports data alignment for logical to physical table compression in accordance with examples as disclosed herein.

FIG. 4 illustrates an example of a cursor 400 that supports data alignment for logical to physical table compression in accordance with examples as disclosed herein. Cursor 400 may include a 4×4 array that may include slots for LBAs 425. LBA 425 may be an example of the LBAs as described with reference to FIGS. 2 and 3. In some cases, the cursor 400 may include any quantity of sections. A cursor 400 may be used to identify physical addresses of a memory system to use during a write operation. When the host system sends an LBA with a write command, the LBA may be not be associated with a physical address of the memory system. The cursor 400 may be used to allocate a physical address to an LBA. The cursor 400 may use a different structure to account for sections and partially filled sections that use the operations described herein.

The cursor 400 may be used during write operations to identify a location to store data. In some examples, the cursor 400 may include an open block to write to and feed up physical addresses. The cursor 400 may track which page 420, block 415, plane 410, and die 405 to store the LBA 425. In some cases, the cursor 400 may identify the next location (e.g., page 420, block 415, plane 410, and die 405) to store the next LBA 425. For example, the cursor 400 may identify that LBA 425-*a* may be stored in page 420-*a*, block 415, plane 410-*a*, and die 405-*a*. In other examples, the cursor 400 may identify that LBA 425-*b* may be stored in page 420-*a*, block 415, plane 410-*b*, and die 405-*a*. In some cases, the cursor 400 may be an example of a bit map. For example, one bit may be addressed per open slot in the cursor 400. The cursor 400 may include one LBA 425 per slot.

The fill order of the cursor 400 may start with a location of LBA 425-*a* (e.g., page 420-*a*, block 415, plane 410-*a*, and die 405-*a*) and continue to a location of LBA 425-*b* (e.g., page 420-*a*, block 415, plane 410-*b*, and die 405-*a*) The cursor 400 may continue to fill the slots with LBAs 425 such that a location of LBA 425-*c* (e.g., page 420-*a*, block 415, plane 410-*a*, and die 405-*b*) may fill next and followed by a location of LBA 425-*d* (e.g., page 420-*a*, block 415, plane 410-*b*, and die 405-*b*). The cursor 400 may continue to fill the next page 420 (e.g., page 420-*b*) with LBA 425-*e* at location page 420-*b*, block 415, plane 410-*a*, and die 405-*a*.

In some cases, the LBAs 425 associated with page 420-*a* and page 420-*b* may be an example of a first section. The LBAs 425 associated with page 420-*c* and page 420-*b* may be an example of a second section. In such cases, cursor 400 may include two sections (e.g., big logical pages). In some cases, the sections may fill data (e.g., LBAs 425) sequentially. In other examples, the sections may fill data (e.g., LBAs 425) randomly.

In some cases, the memory system may identify a section and a page 420 for storing data associated with the command based on performing the operation on the LBA and information associated with the cursor 400 of the memory device. For example, the memory system may identify information associated with the cursor 400. In some examples, cursor 400 may include 16 slots to identify a location to store data. The memory system may select the 16 slots and use the modulo operation to identify the locations to store the data.

In some examples, a page index of the first section may be empty. In such cases, the memory system may identify the page index of the section for storing data associated with the LBA 425 of the command where the page index may indicate a page 420 of the section. The memory device may identify a slot (e.g., page index) of the section to write the LBA 425. For example, the memory system may identify that the page index of the first section (e.g., page 420-*a*, block 415, plane 410-*a*, and die 405-*a*) is empty. In such cases, the memory system may write the LBA 425-*a* to the identified page index.

In some examples, a page index of the first section (e.g., including page 420-*a* and page 420-*b*) may be occupied (e.g., storing data), however, different page indexes of the first section may still be unoccupied. For example, the memory system may identify that the page index of the first section (e.g., page 420-*a*, block 415, plane 410-*a*, and die 405-*a*) is occupied (e.g., LBA 425-*a* is stored). In such cases, the memory system may then identify the next available slot of a different section (e.g., second section) if the slot of the first section is occupied. For example, the system may identify that the page index of the second section (e.g., including page 420-*c* and page 420-*d*) is unoccupied. In such cases, the memory system may identify that a page index of the second section (e.g., page 420-*c*, block 415, plane 410-*a*, and die 405-*a*) is empty and write the LBA 425 to the empty page index.

Based on the modulo operation, the first LBA 425 may be written to the first page index in the first section. The second LBA 425 may be written to the second page index, the third page index, or the fourth page index in the first section or the first page index in a second section. If the section includes four pages 420 (e.g., page 420-*a*, 420-*b*, 420-*c*, and 420-*d*) in each section, each section may include a first index, a second index, a third index, and a fourth index. The memory system may write to a first index of page 420-*a* and identify that the first index is occupied. In such cases, the memory system may identify a first index in a second section to write to.

In some cases, the memory system may identify an unoccupied page index in the section and write placeholder data 430 to a page 420 of the section indicated by the unoccupied page index. For example, the memory system may write placeholder data 430 in the unoccupied page of the section indicated by the cursor 400 if the open slots of the section may be unaligned. The placeholder data 430 may be an example of dummy data or garbage collection data. During a garbage collection procedure, the memory system may discard the garbage collection data (e.g., placeholder data 430).

Figure 5:
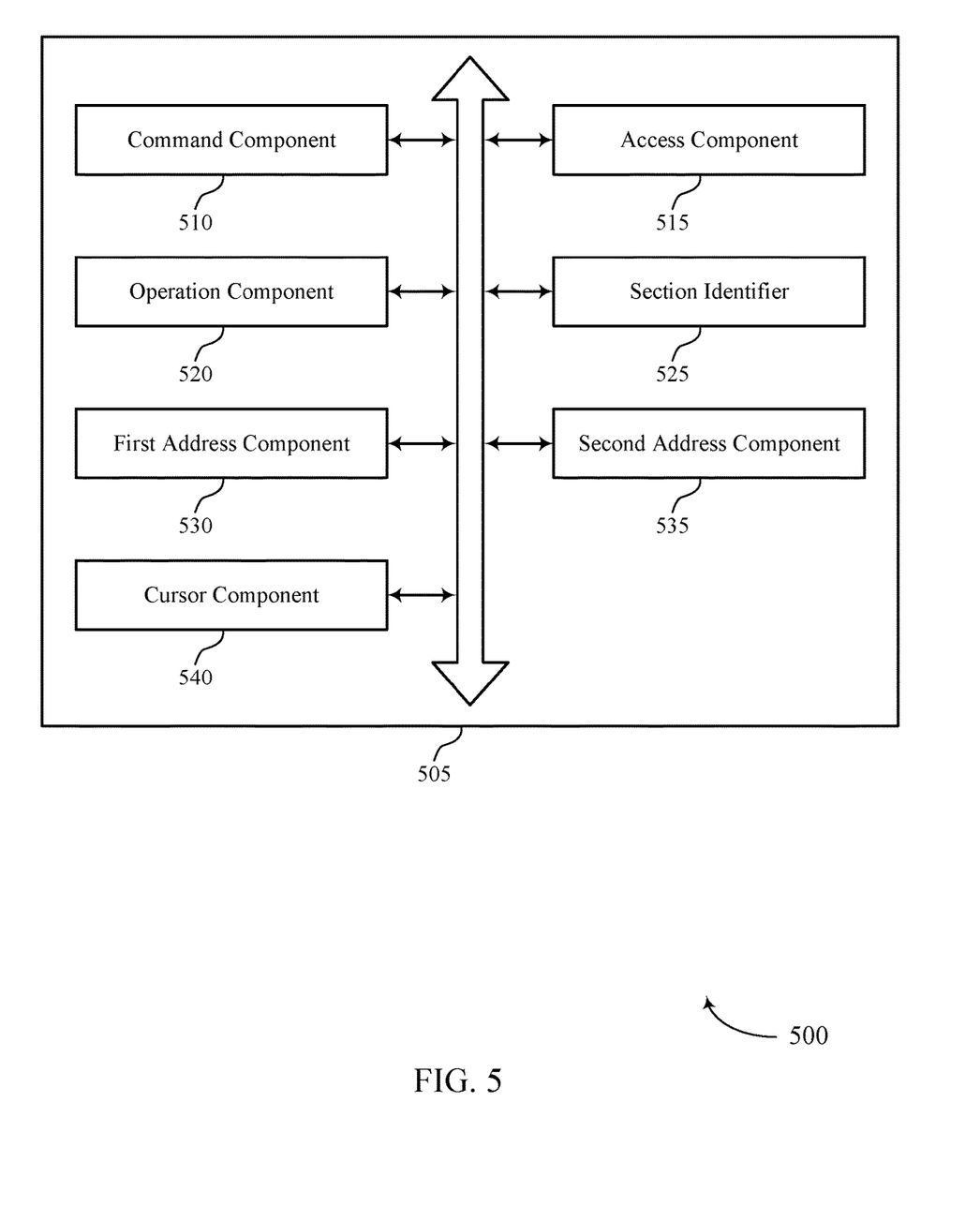
FIG. 5 shows a block diagram of a memory device that supports data alignment for logical to physical table compression in accordance with examples as disclosed herein.

FIG. 5 shows a block diagram 500 of a memory system 505 that supports data alignment for logical to physical table compression in accordance with examples as disclosed herein. The memory system 505 may be an example of aspects of a memory device as described with reference to FIGS. 1 through 4. The memory device 505 may include a command component 510, an access component 515, an operation component 520, a section identifier 525, a first address component 530, a second address component 535, and a cursor component 540. Each of these modules may communicate, directly or indirectly, with one another (e.g., via one or more buses).

The command component 510 may receive a command to access a logical block address associated with a memory device. In some examples, the command component 510 may receive a command to access a set of logical block addresses associated with the memory device. In some cases, the command includes the logical block address.

The access component 515 may access the physical address of the memory device based on identifying the first portion and the second portion. In some examples, the access component 515 may write placeholder data to a page of the section indicated by the unoccupied page index based on identifying the unoccupied page index. In some examples, the access component 515 may identify the physical address based on identifying the first portion and the second portion, where accessing the physical address is based on identifying the physical address. In some cases, the placeholder data includes dummy data or data associated with a garbage collection operation.

The operation component 520 may perform an operation on the logical block address included in the command based on receiving the command. In some examples, the operation component 520 may perform an operation on the set of logical block addresses included in the command based on receiving the command. In some cases, the operation performed on the logical block address includes a modulo operation.

The section identifier 525 may identify a section of the memory device associated with the logical block address based on the logical block address and a logical-to-physical table stored by the memory device, the section including a set of pages that are each mapped to one of a set of physical addresses. In some examples, the section identifier 525 may identify a first page of the set of pages in the section based on performing the operation on the logical block address, where accessing the physical address includes accessing the first page. In some examples, the logical-to-physical table of the memory device stores a mapping between logical block addresses and sections of the memory device.

In some examples, the section identifier 525 may identify a page index of a section for storing data associated with the logical block address of the command based on performing the operation on the logical block address, the page index indicating a page of the section, where accessing the physical address includes writing the data to the page indicated by the page index. In some examples, the section identifier 525 may identify that the page index of a second section of the memory device is occupied, where identifying the page index of the section for storing the data is based on identifying that the page index of the second section of the memory device is storing data. In some examples, the section identifier 525 may identify an unoccupied page index in the section based on writing the data to the page indicated by the page index.

The first address component 530 may identify a first portion of a physical address of the memory device associated with the logical block address based on the logical block address. In some examples, the first address component 530 may identify corrupt data, unmapped data, garbage collection data, or a combination thereof based on one or more bits included in a logical-to-physical table for the logical block address. In some examples, the first address component 530 may identify a first portion of a set of physical addresses of the memory device associated with the set of logical block addresses based on the set of logical block addresses.

The second address component 535 may identify a second portion of the physical address based on performing the operation. In some examples, the second address component 535 may identify a second portion of the set of physical addresses based on performing the operation.

The cursor component 540 may identify a section and a page for storing data associated with the command based on performing the operation on the logical block address and information associated with a cursor of the memory device, where accessing the physical address includes writing data to the page indicated by a page index.

Figure 6:
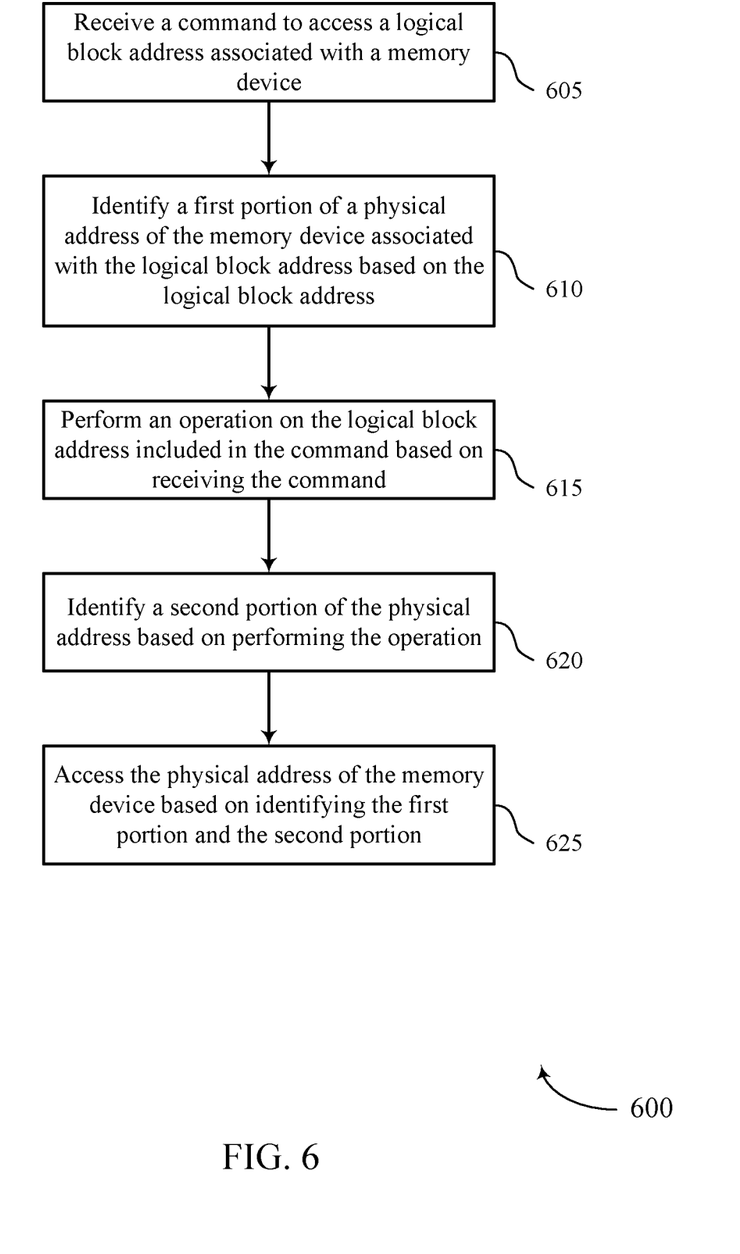
FIG. 6 shows a flowchart illustrating a method or methods that support data alignment for logical to physical table compression in accordance with examples as disclosed herein.

FIG. 6 shows a flowchart illustrating a method or methods 600 that supports data alignment for logical to physical table compression in accordance with examples as disclosed herein. The operations of method 600 may be implemented by a memory system or its components as described herein. For example, the operations of method 600 may be performed by a memory system as described with reference to FIG. 5. In some examples, a memory system may execute a set of instructions to control the functional elements of the memory system to perform the described functions. Additionally or alternatively, a memory system may perform aspects of the described functions using special-purpose hardware.

At 605, a command to access a logical block address associated with a memory device may be received. For example, the memory device may receive a command to access a logical block address associated with a memory device. The operations of 605 may be performed according to the methods described herein. In some examples, aspects of the operations of 605 may be performed by a command component as described with reference to FIG. 5.

At 610, a first portion of a physical address of the memory device associated with the logical block address may be identified. For example, the memory device may identify a first portion of a physical address of the memory device associated with the logical block address based on the logical block address. The operations of 610 may be performed according to the methods described herein. In some examples, aspects of the operations of 610 may be performed by a first address component as described with reference to FIG. 5.

At 615, an operation may be performed on the logical block address. For example, the memory device may perform an operation on the logical block address included in the command based on receiving the command. The operations of 615 may be performed according to the methods described herein. In some examples, aspects of the operations of 615 may be performed by an operation component as described with reference to FIG. 5.

At 620, a second portion of the physical address may be identified. For example, the memory device may identify a second portion of the physical address based on performing the operation. The operations of 620 may be performed according to the methods described herein. In some examples, aspects of the operations of 620 may be performed by a second address component as described with reference to FIG. 5.

At 625, the physical address of the memory device may be accessed. For example, the memory device may access the physical address of the memory device based on identifying the first portion and the second portion. The operations of 625 may be performed according to the methods described herein. In some examples, aspects of the operations of 625 may be performed by an access component as described with reference to FIG. 5.

In some examples, an apparatus as described herein may perform a method or methods, such as the method 600. The apparatus may include features, means, or instructions (e.g., a non-transitory computer-readable medium storing instructions executable by a processor) for receiving a command to access a logical block address associated with a memory device, identifying a first portion of a physical address of the memory device associated with the logical block address based on the logical block address, performing an operation on the logical block address included in the command based on receiving the command, identifying a second portion of the physical address based on performing the operation, and accessing the physical address of the memory device based on identifying the first portion and the second portion.

Some examples of the method 600 and the apparatus described herein may further include operations, features, means, or instructions for identifying a section of the memory device associated with the logical block address based on the logical block address and a logical-to-physical table stored by the memory device, the section including a set of pages that may be each mapped to one of a set of physical addresses, and identifying a first page of the set of pages in the section based on performing the operation on the logical block address, where accessing the physical address includes accessing the first page.

In some examples of the method 600 and the apparatus described herein, the logical-to-physical table of the memory device stores a mapping between logical block addresses and sections of the memory device.

Some examples of the method 600 and the apparatus described herein may further include operations, features, means, or instructions for identifying a page index of a section for storing data associated with the logical block address of the command based on performing the operation on the logical block address, the page index indicating a page of the section, where accessing the physical address includes writing the data to the page indicated by the page index.

Some examples of the method 600 and the apparatus described herein may further include operations, features, means, or instructions for identifying that the page index of a second section of the memory device may be occupied, where identifying the page index of the section for storing the data may be based on identifying that the page index of the second section of the memory device may be storing data.

Some examples of the method 600 and the apparatus described herein may further include operations, features, means, or instructions for identifying an unoccupied page index in the section based on writing the data to the page indicated by the page index, and writing placeholder data to a page of the section indicated by the unoccupied page index based on identifying the unoccupied page index.

In some examples of the method 600 and the apparatus described herein, the placeholder data includes dummy data or data associated with a garbage collection operation.

Some examples of the method 600 and the apparatus described herein may further include operations, features, means, or instructions for identifying a section and a page for storing data associated with the command based on performing the operation on the logical block address and information associated with a cursor of the memory device, where accessing the physical address includes writing data to the page indicated by a page index.

Some examples of the method 600 and the apparatus described herein may further include operations, features, means, or instructions for identifying the physical address based on identifying the first portion and the second portion, where accessing the physical address may be based on identifying the physical address.

Some examples of the method 600 and the apparatus described herein may further include operations, features, means, or instructions for identifying corrupt data, unmapped data, garbage collection data, or a combination thereof based on one or more bits included in a logical-to-physical table for the logical block address.

Some examples of the method 600 and the apparatus described herein may further include operations, features, means, or instructions for receiving a command to access a set of logical block addresses associated with the memory device, identifying a first portion of a set of physical addresses of the memory device associated with the set of logical block addresses based on the set of logical block addresses, performing an operation on the set of logical block addresses included in the command based on receiving the command, and identifying a second portion of the set of physical addresses based on performing the operation.

In some examples of the method 600 and the apparatus described herein, the command includes the logical block address. In some examples of the method 600 and the apparatus described herein, the operation performed on the logical block address includes a modulo operation.

It should be noted that the methods described herein are possible implementations, and that the operations and the steps may be rearranged or otherwise modified and that other implementations are possible. Furthermore, portions from two or more of the methods may be combined.

An apparatus is described. The apparatus may include a memory array and a controller coupled with the memory array and configured to cause the apparatus to receive a command to access a logical block address associated with a memory device, identify a first portion of a physical address of the memory device associated with the logical block address based on the logical block address, perform an operation on the logical block address included in the command based on receiving the command, identify a second portion of the physical address based on performing the operation, and access the physical address of the memory device based on identifying the first portion and the second portion.

Some examples may further include identifying a section of the memory device associated with the logical block address based on the logical block address and a logical-to-physical table stored by the memory device, the section including a set of pages that may be each mapped to one of a set of physical addresses, and identifying a first page of the set of pages in the section based on performing the operation on the logical block address, where accessing the physical address may be executable by the processor to cause the apparatus to access the first page. In some examples, the logical-to-physical table of the memory device stores a mapping between logical block addresses and sections of the memory device.

Some examples may further include identifying a page index of a section for storing data associated with the logical block address of the command based on performing the operation on the logical block address, the page index indicating a page of the section, where accessing the physical address may be executable by the processor to cause the apparatus to write the data to the page indicated by the page index.

Some examples may further include identifying that the page index of a second section of the memory device may be occupied, where identifying the page index of the section for storing the data may be based on identifying that the page index of the second section of the memory device may be storing data.

Some examples may further include identifying an unoccupied page index in the section based on writing the data to the page indicated by the page index, and writing placeholder data to a page of the section indicated by the unoccupied page index based on identifying the unoccupied page index. In some examples, the placeholder data includes dummy data or data associated with a garbage collection operation.

Some examples may further include identifying a section and a page for storing data associated with the command based on performing the operation on the logical block address and information associated with a cursor of the memory device, where accessing the physical address may be executable by the processor to cause the apparatus to write data to the page indicated by a page index.

Some examples may further include identifying the physical address based on identifying the first portion and the second portion, where accessing the physical address may be based on identifying the physical address.

Some examples may further include identifying corrupt data, unmapped data, garbage collection data, or a combination thereof based on one or more bits included in a logical-to-physical table for the logical block address.

Some examples may further include receiving a command to access a set of logical block addresses associated with the memory device, identifying a first portion of a set of physical addresses of the memory device associated with the set of logical block addresses based on the set of logical block addresses, performing an operation on the set of logical block addresses included in the command based on receiving the command, and identifying a second portion of the set of physical addresses based on performing the operation.

In some examples, the command includes the logical block address. In some examples, the operation performed on the logical block address includes a modulo operation.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other cases, the substrate may be a silicon-on-insulator (SOI) substrate, such as silicon-on-glass (SOG) or silicon-on-sapphire (SOS), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory device, comprising:
one or more memory arrays; and
one or more controllers coupled with the one or more memory arrays and configured to cause the memory device to:
receive a command to access a logical block address (LBA) associated with the memory device;
perform a first operation, based at least in part on receiving the command, on an entirety of the LBA included in the received command and on a logical-to-physical (L2P) table associated with the memory device;
identify a first portion of a location in the memory device associated with the LBA based at least in part on performing the first operation, wherein first portion corresponds to a section within the L2P table;
perform a second operation, based at least in part on receiving the command, on the entirety of the LBA included in the received command and on the L2P table;
identify a second portion of the location in the memory device associated with the LBA based at least in part on performing the second operation, wherein the second portion corresponds to a first page of the section, within the L2P table, for storing data; and
write the data to the first page associated with a physical address of the memory device based on location in the L2P table indicated by the first portion and the second portion.

2. The apparatus memory device of claim 1, wherein the L2P table of the memory device stores a mapping between logical block addresses and sections of the memory device.

3. The memory device of claim 1, wherein the one or more controllers are further configured to cause the memory device to:
identify that the first page of the section of the memory device is occupied, wherein identifying the first page of the section for storing the data is based at least in part on identifying that the first page of the section of the memory device is occupied.

4. The memory device of claim 1, wherein the one or more controllers are further configured to cause the memory device to:
identify, based at least in part on writing the data to the first page indicated by a page index, an unoccupied page index in the section; and
write, based at least in part on identifying the unoccupied page index, placeholder data to a second page of the section indicated by the unoccupied page index.

5. The memory device of claim 4, wherein the placeholder data comprises dummy data or data associated with a garbage collection operation.

6. The memory device of claim 1, wherein the one or more controllers are further configured to cause the memory device to:
identify, based at least in part on identifying the second portion of the location and based at least in part on information associated with a cursor of the memory device, the first page for storing the data.

7. The memory device of claim 1, wherein the one or more controllers are further configured to cause the memory device to:
identify the physical address based at least in part on identifying the first portion and the second portion, wherein writing the data to the first page is based at least in part on identifying the physical address.

8. The memory device of claim 1, wherein the one or more controllers are further configured to cause the memory device to:
identify corrupt data, unmapped data, garbage collection data, or a combination thereof based at least in part on one or more bits included in the L2P table.

9. The memory device of claim 1, wherein the command comprises the logical block address.

10. The memory device of claim 1, wherein the first operation performed on the logical block address comprises a modulo operation.

11. A non-transitory storage medium storing code comprising instructions, which when executed by one or more processors of an electronic device, cause the electronic device to:
receive a command to access a logical block address (LBA) associated with a memory device;
perform a first operation, based at least in part on receiving the command, on an entirety of the LBA included in the received command and on a logical-to-physical (L2P) table associated with the memory device;
identify a first portion of a location in the memory device associated with the LBA based at least in part on performing the first operation, wherein first portion corresponds to a section within the L2P table;
perform a second operation, based at least in part on receiving the command, on the entirety of the LBA included in the received command and on the L2P table;

identify a second portion of the location in the memory device associated with the LBA based at least in part on performing the second operation, wherein the second portion corresponds to a first page of the section, within the L2P table, for storing data; and write the data to the first page associated with a physical address of the memory device based on location in the L2P table indicated by the first portion and the second portion.

12. The non-transitory storage medium of claim 11, wherein the instructions, when executed by the one or more processors of the electronic device, further cause the electronic device to:

identify that the first page of the section of the memory device is occupied, wherein identifying the first page of the section for storing the data is based at least in part on identifying that the first page of the section of the memory device is occupied.

13. The non-transitory storage medium of claim 11, wherein the instructions, when executed by the one or more processors of the electronic device, further cause the electronic device to:

identify, based at least in part on writing the data to the first page indicated by a page index, an unoccupied page index in the section; and write, based at least in part on identifying the unoccupied page index, placeholder data to a second page of the section indicated by the unoccupied page index.

14. The non-transitory storage medium of claim 13, wherein the placeholder data comprises dummy data or data associated with a garbage collection operation.

15. The non-transitory storage medium of claim 11, wherein the instructions, when executed by the one or more processors of the electronic device, further cause the electronic device to:

identify, based at least in part on identifying the second portion of the location and based at least in part on information associated with a cursor of the memory device, the first page for storing the data.

16. The non-transitory storage medium of claim 11, wherein the instructions, when executed by the one or more processors of the electronic device, further cause the electronic device to:

identify corrupt data, unmapped data, garbage collection data, or a combination thereof based at least in part on one or more bits included in the L2P table.

17. The non-transitory storage medium of claim 11, wherein the first operation performed on the logical block address comprises a modulo operation.

18. A method by a memory device, comprising:

receiving a command to access a logical block address (LBA) associated with the memory device;

performing a first operation, based at least in part on receiving the command, on an entirety of the LBA included in the received command and on a logical-to-physical (L2P) table associated with the memory device;

identifying a first portion of a location in the memory device associated with the LBA based at least in part on performing the first operation, wherein first portion corresponds to a section within the L2P table;

performing a second operation, based at least in part on receiving the command, on the entirety of the LBA included in the received command and on the L2P table;

identifying a second portion of the location in the memory device associated with the LBA based at least in part on performing the second operation, wherein the second portion corresponds to a first page of the section, within the L2P table, for storing data; and writing the data to the first page associated with a physical address of the memory device based on location in the L2P table indicated by the first portion and the second portion.

* * * * *